INVENTOR
Frederick H. Holwick.
BY
Edwin S. Booth
ATTORNEY

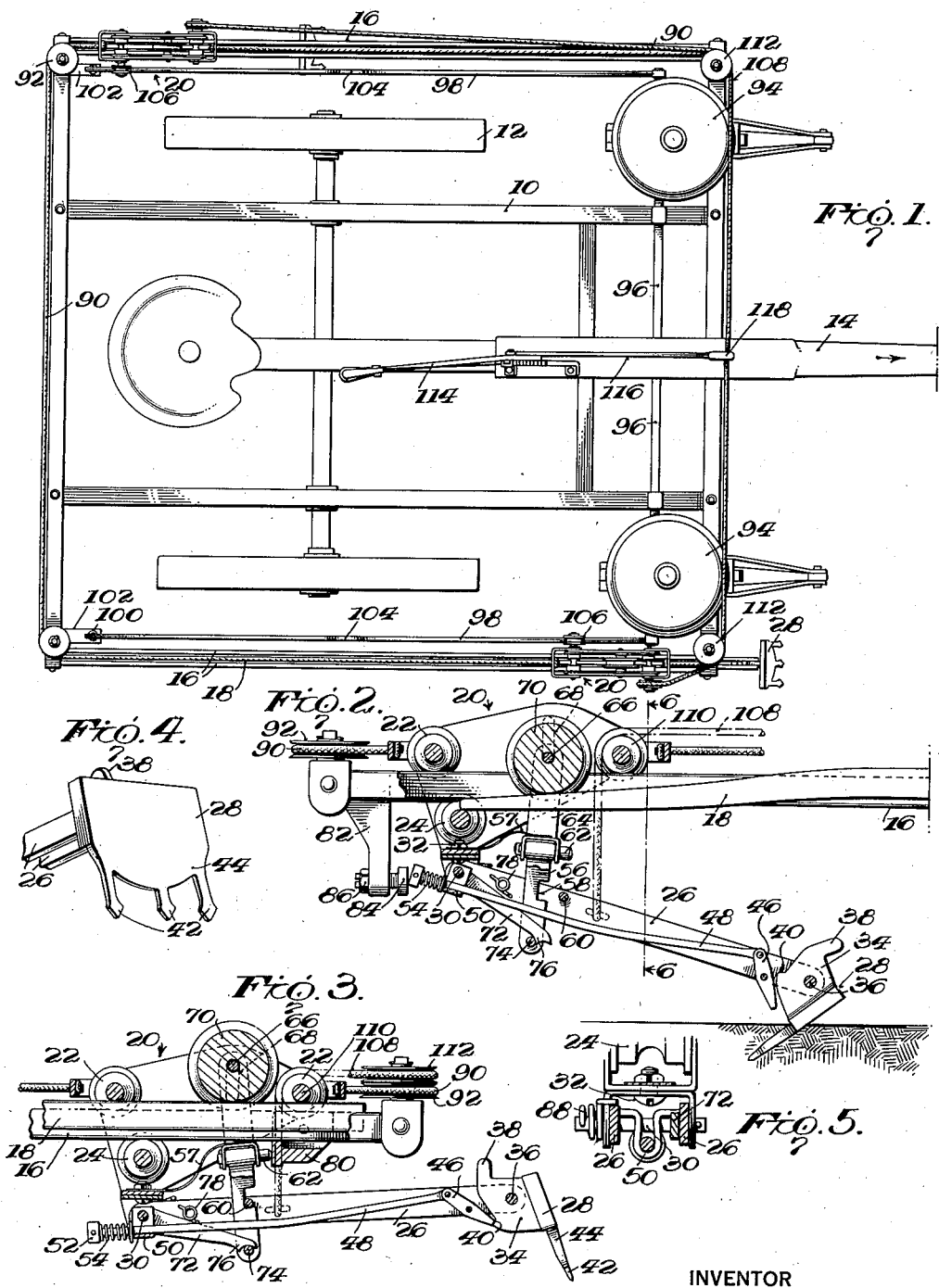
Jan. 19, 1937.  F. H. HOLWICK  2,068,105
PLANTING IMPLEMENT
Filed June 2, 1934  2 Sheets-Sheet 1
INVENTOR
*Frederick H. Holwick.*
BY
*Edwin S. Booth*
ATTORNEY Jan. 19, 1937.  F. H. HOLWICK  2,068,105
PLANTING IMPLEMENT
Filed June 2, 1934    2 Sheets-Sheet 2

Patented Jan. 19, 1937

2,068,105

UNITED STATES PATENT OFFICE 2,068,105

PLANTING IMPLEMENT

Frederick H. Holwick, near West Union, Ill.

Application June 2, 1934, Serial No. 728,761

18 Claims. (Cl. 111—27)

This invention relates to a planting implement and more particularly to an implement for check-row planting in which no wire or other device is stretched across the field to be planted. In implements heretofore used for check-row planting, wires have been employed anchored at opposite ends of the field to be planted and having obstructions placed thereon at intervals to operate the dropping mechanism on the planter. In the use of these implements it is necessary to disengage the wire from the planter at each end of the field in order to turn around and to reengage it before starting to plant another row. Also it is necessary for the operator to move the anchor for the wire at each turn and in the event of obstructions, such as trees, in the middle of the field a great deal of manipulation of the wire becomes necessary. Thus the use of such a wire results in a great deal of inconvenience and waste of time.

If the dropping mechanism or planter unit is operated from the wheels of the implement the results are very inaccurate due to the variations in the length of travel between each operation of the planter unit resulting from roughness of the ground or slipping of the wheels.

According to the present invention the planter unit is operated by a mechanism carried by the implement and engaging the ground independently of the wheels thereof in such a way that the planter unit is operated at predetermined intervals of travel of the implement with respect to the ground. This mechanism preferably takes the form of a plurality of carriage members operating on tracks and so connected that as one moves in one direction the adjacent one moves in the opposite direction. These carriage members pivotally carry arms having ground engaging heads which cause the carriages to move on their tracks as the implement progresses. There is also provided a cam track which controls a latch for picking up the head as the carriage reaches the rearward part of the implement, the latch being released as the carriage reaches the forward part of the implement to permit the head to engage the ground and being held in inoperative position while the head is in engagement with the ground. The heads also have latch means to hold them in proper position to engage the ground and to release them for free pivotal movement when they are to become inactive. Mechanism is also provided to raise the heads at will to facilitate turning or movement of the implement without operation of the planter units.

In operation on extremely rough ground movement of the implement may become so great as to adversely affect the operation of the mechanism and it is, therefore, contemplated to mount the tracks carrying the carriages on separate wheels so that they can move relatively to the implement frame. In this way vertical movement of the tracks is made substantially independent of movement of the implement and the tracks are maintained at a more nearly uniform distance from the ground.

The implement according to the present invention carries the usual planter units operating in the usual way to deposit the seed. These units are, however, operated in accordance with the movement of the cariages on the tracks, it being contemplated that one or more hills may be planted at each travel of the carriages. Preferably each unit carries a rod having cam portions thereon cooperating with a rider on the carriage so that as the rider strikes the cam portion the arm is moved and the unit operated to drop the seeds. If only one cam portion is provided on each arm only one hill will be planted for each travel of the carriage but if a plurality of cam portions are provided a hill will be planted for each cam portion for each travel of the carriage.

A clearer understanding of the invention, including the various objects and novel features thereof, will be had from the following detailed description when taken in connection with the accompanying drawings. It is to be understood, however, that the drawings are for the purpose of illustration only and are not to be taken as a definition of the limits of the invention, reference being had for this purpose to the appended claims.

In the drawings wherein like reference numerals indicate like parts throughout the several views:

Fig. 1 is a plan view of an implement embodying the present invention with parts omitted;

Fig. 2 is a side view of a part of the mechanism with parts removed for the sake of clarity;

Fig. 3 is a view similar to Fig. 2 showing the parts in a different position;

Figs. 4 and 5 are detailed views;

Figure 8:
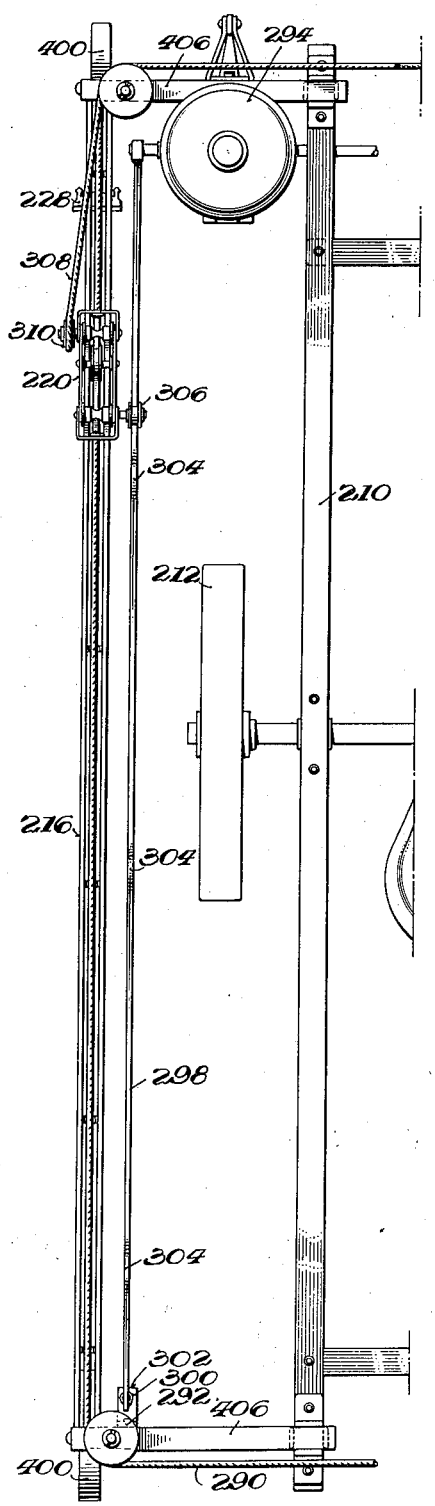
Fig. 8 is a partial plan view of another embodiment of the invention.

Referring more particularly to Figs. 1 to 7 of the drawings there is shown therein a corn planter embodying the present invention constituted by a frame 10 supported on wheels 12 and having a tractive member 14 adapted to be secured to any suitable source of motive power such as horses, a tractor or the like. Secured to the frame 10 at the sides thereof are a pair of track members constituted by two straight outer members 16 and a central cam track 18 which extends substantially parallel for the major portion of its length but is depressed at its rearward portion as clearly shown in Fig. 2. A carriage indicated generally at 20 is mounted for longitudinal movement on the tracks 16 by means of rollers 22 engaging the upper surfaces thereof and a roller 24 engaging the lower surfaces thereof, there being a ground engaging member constituted by a pair of arms 26 and a head 28 supported by each carriage member by a horizontal pivot 30 in a U-shaped bracket which is pivoted to the carriage by a vertical pivot 32. The horizontal pivot permits movement of the ground engaging member toward and away from the ground while the vertical pivot permits swinging thereof in a horizontal plane relative to the carriage to allow for slight changes of direction of the implement while the ground engaging member is in the ground.

The head 28 is constituted by a flange portion 34 extending between the arms 26 and secured thereto by a pivot pin 36, the flange portion being provided with a trip finger 38 and a shoulder or notch 40 the purpose of which will appear hereinafter. The head also has a ground engaging portion constituted by spikes 42 and a plate 44 overlying the spikes at the front sides thereof, the spikes being adapted to penetrate hard ground or clods and the plate to provide a large bearing surface to prevent slipping in soft ground.

Means are provided for releasably holding the head to prevent pivotal movement thereof and, as shown, such means are constituted by a latch 46 pivoted to the arms 26 and having one end adapted to engage the shoulder 40, the other end being secured to a rod 48 which is supported between arms 26 by a bracket 50. The rod 48 terminates in an enlarged portion 52 and a compression spring 54 acts between this portion and the bracket 50 to constantly urge the latch 46 into a position to engage the shoulder 40.

In order to raise the ground engaging members to permit forward movement thereof, a latch 56 is provided having a notch 58 therein adapted to engage a pin 60 secured to the arms 26. The latch is pivoted about a longitudinally extending pin 62 in a bracket member 64 which is supported by a transverse pin 66 extending through vertical slots 68 in the sides of the carriage 20. A roller 70 is mounted on the pin 68 and rides on the cam track 18 so that the latch will be raised or lowered as roller 70 rides up or down the cam. A suitable spring 57 is also provided urging latch 56 forwardly into its operative or engaged position.

Means are provided to hold the latch 56 in inoperative position while head 28 is in engagement with the ground and as shown such means are constituted by a second latch 72 pivoted about the pin 30 and engaging a pin 74 which is connected to the latch 56. The latch 72 has a projection 76 thereon and a suitable spring 78 is provided for holding the latch against the pin 74 while the latch is in raised position but out of contact when the latch is lowered for a purpose which will appear hereinafter.

Each of the track members has secured thereto at its forward end a fixed stop 80 and at its rearward end a bracket 82 into which an adjustable stop 84 is screw threaded, a suitable lock nut 86 being provided to retain the stop 84 in adjusted position.

In operation of the individual carriages as so far described, the head 28 engages the ground and as the implement moves forward the carriage moves rearwardly relatively to the track member until it reaches the position shown in Fig. 2. At this time the end of rod 48 strikes the stop 84 releasing latch 46 and permitting the head 28 to tilt about its pivot so that on further forward movement it will be withdrawn from the ground. At the same time roller 70 has moved down cam track 18 lowering latch 56 to a position where the notch 58 therein is opposite the pin 60, latch 72 being simultaneously lowered until it moves away from spring 78. The latch 72 is now resting lightly on the pin 74 and the pressure of spring 57 will be sufficient to force latch 56 to the right, in which position projection 76 thereon will be to the left of pin 74 as seen in Fig. 3 and notch 58 will engage pin 60.

Upon continued forward movement of the implement the carriage will be moved forwardly on the track by mechanism to be described hereinafter, the roller 70 during this time riding up the cam track 18 and raising arm 26 and head 28 to the position shown in Fig. 3. As the carriage approaches the forward end of the track trip finger 38 strikes stop 80 and rocks head 28 into the position shown in Fig. 3 in which latch 46 is engaged with shoulder 40. Forward movement continues until pin 62 strikes stop 80 when latch 56 will be swung to the left to release the pin 60 thus permitting arm 26 to drop whereby members 42 and 44 will be forced into the ground. If desired a spring 88 may be provided urging arm 26 downwardly to assist gravity in forcing members 42 and 44 into the ground when the latch is released. As the latch 56 is forced to the left the pin 74 rides across the projection 76 and since spring 78 is at this time urging the latch 72 downwardly the spring 57 will be unable to move latch 56 to the right and it will be held in inoperative position. As forward movement of the implement continues the carriage will again move rearwardly relatively to the track and the cycle of operations will be repeated.

In the implement illustrated in Fig. 1 an identical carriage 20 is mounted on each of the tracks and the carriages are interconnected by a flexible cable 90 passing over pulleys 92 at the corners of the frame in such a manner that as one of the carriages moves forwardly on its track the other moves rearwardly. The length of cable 90 and stops 84 are so adjusted that as pin 62 of one carriage strikes stop 80 on its track, the end of rod 48 on the other carriages strikes stop 84 on its track so that one head 28 will engage the ground simultaneously as the other is released. Thus it will be apparent that as the implement moves along, one of the ground engaging members will always be in engagement with the ground and the carriages will reciprocate longitudinally on their tracks.

The implement carries the usual planter units indicated generally at 94, these units not being shown in detail since their specific construction forms no part of the present invention. It will be understood, however, that these units are of the type usually employed on check-row planting implements and include suitable dropping mechanism adapted to be periodically actuated to plant a hill of seeds. Rods 96 are rotatably mounted on the frame 10 and are connected with the dropping mechanism to actuate the same each time the rods are rocked about their axes. The rods are preferably separate for independent actuation of the dropping mechanisms but they may, if desired, be connected for simultaneous operation.

Means are provided for operating the planter units or dropping mechanism in accordance with movement of the carriages on the tracks and as shown such means are constituted by a pair of rods 98 secured to the rods 96 and extending parallel to the tracks 16. The rods 98 are supported at their rear ends on springs 100 resting on brackets 102 so that they can move about rods 96 as pivots, it being understood that each time the rods 98 are depressed the rods 96 are rocked to operate the planter units. Each rod 98 has at substantially its center a raised cam portion 104 (see Fig. 7) and each of the carriages carries a roller 106 which rides on the adjacent rod 98 so that as the rollers 106 ride over the cam portions 104, the rods 98 are depressed to operate the planter units. The cam portions are so placed that as the roller 106 on one carriage moving forwardly rides over the adjacent cam portion, the roller 106 on the other carriage moving rearwardly rides over its adjacent cam portion to operate both planter units simultaneously.

In order to render the planting mechanism inoperative while going to or from the field to be planted or while turning at the end of a row, a second flexible cable 108 is provided connected to the arms 26 and passing over pulleys 110 carried by the carriages and pulleys 112 at the forward corners of the frame. A suitable manually operable lever 114 is pivoted on the frame, this preferably being the usual lever for raising the planter shoes from the ground in a manner understood by those skilled in the art. A rod 116 is pivoted to lever 114 at one end and at its other end is provided with an enlarged eye 118 through which the cable 108 passes. When the lever 114 is pulled, it simultaneously raises the planter shoes and pulls on the cable 108 to raise the ground engaging member which is in engagement with the ground so that the implement may be moved without operating the planting mechanism. In turning at the end of a row the operator merely pulls lever 114, makes his turn and, when the head member which was raised is in alignment with the mark it left in the ground in the previous row, lets down lever 114 to again drop the head member in the ground. In this manner the ground engaging head member serves as a marker to enable alignment of the transverse rows and the operator is enabled to make a turn and start a new row without dismounting from the implement.

Figure 9:
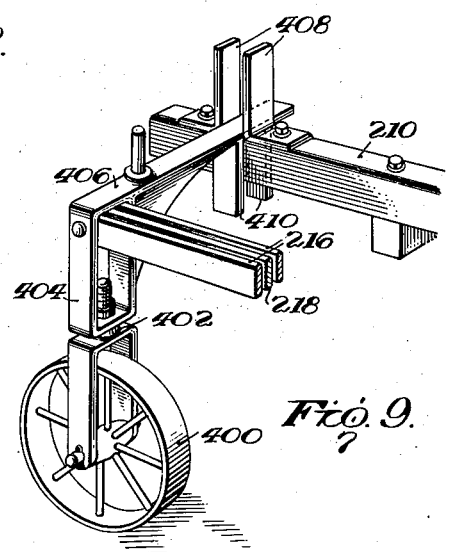
Fig. 9 is a partial perspective view of the embodiment shown in Fig. 8.
Figure 7:
Fig. 7 is a perspective view of a detail.
Figure 6:
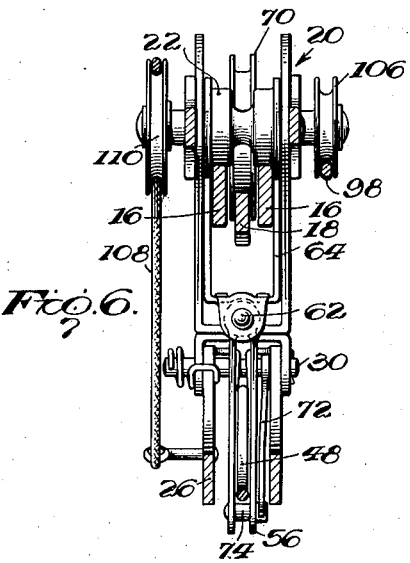
Fig. 6 is a section on the line 6—6 of Fig. 2.

Referring now to Figs. 8 and 9 there is shown therein another embodiment of the invention, parts in these figures corresponding to like parts in the preceding figures being indicated by the same reference numerals plus 200. In this embodiment the frame 210 is supported on wheels 212 and the track 216 is independently supported on caster wheels 400 adapted to freely pivot about substantially vertical axes 402 carried by brackets 404 rigidly secured to the tracks. The brackets 404 have transverse extensions 406 extending across the frame 210 and vertically movable between brackets or guides 408 secured thereto, there being brackets or guides 410 secured to the extensions 406 and slidably embracing the frame 210. Thus it will be seen that the track may move vertically relative to the frame but is restrained from any horizontal movement by the brackets 408 and 410.

In this embodiment the rods 298 are provided with a plurality of cam portions 304 adapted to be successively engaged by the roller 306 on carriage 220 so that the planter unit will be operated a plurality of times each time carriage traverses the length of track 216. It will be understood that the mechanism shown in Fig. 8 is duplicated on the opposite side of the implement and that the rollers 306 strike cam portions of rods 298 simultaneously so that the planter units are operated at the same time. Operation of this embodiment is otherwise the same as that shown in Figs. 1 to 7.

Thus there is provided by the present invention a novel planting implement in which no wire is employed and in which the seeds are dropped at exact predetermined intervals along the rows regardless of roughness of the ground. Further the implement is easy to operate since it is possible to turn at the end of a row without dismounting and to start each new row in correct transverse alignment with the other rows.

While only two embodiments of the invention have been shown and described it will be apparent to those skilled in the art that many mechanical changes might be made or that the same might be embodied in other forms. The illustrated embodiments will, therefore, not be taken as a definition of the limits of the invention but reference will be had for this purpose to the appended claims.

What is claimed is:

1. A planting implement comprising a frame, a carriage, means mounting said carriage on the frame for movement longitudinally thereof, means on said carriage for engaging the ground and means including a releasable latch engageable with said ground engaging means and operable by movement of said carriage longitudinally of the frame for disengaging said ground engaging means from the ground.

2. A planting implement comprising a frame, a carriage, means mounting said carriage on the frame for movement longitudinally thereof, a planter unit mounted on the frame, means operable by movement of said carriage longitudinally of the frame for operating the planter unit, means on said carriage for engaging the ground and means including a releasable latch engageable with said ground engaging means and operable by movement of said carriage longitudinally of the frame for disengaging said last named means from the ground.

3. A planting implement comprising a frame, a plurality of interconnected carriages movable longitudinally thereof, means carried by said carriages respectively and adapted to alternately engage the ground for causing movement of the carriages, latch means for controlling said ground engaging means and fixed means at the opposite ends of the longitudinal paths of said carriages and cooperable with said latch means to operate the same whereby one of said ground engaging means will be operated to engage the ground as another is operated to disengage it.

4. A planting implement comprising a frame, a plurality of interconnected carriages movable longitudinally thereof, means carried by said carriages respectively and adapted to alternately engage the ground for causing movement of the carriages, means operable by movement of said carriages to simultaneously engage one of said ground engaging means with the ground and disengage another, a plurality of planter units, operating means therefor, and means carried by said carriages and engageable with said operating means to operate said planter units at each of a plurality of predetermined points in the movement of said carriages.

5. A planting implement comprising a frame, a track carried thereby, a carriage movable on said track, a cam track, a member carried by said carriage and riding on the cam track, a ground engaging member pivotally mounted on said carriage, a latch on said first named member adapted to engage said ground engaging member to remove it from the ground as said member moves on the cam track, and means for releasing said latch whereby the ground engaging member may engage the ground.

6. A planting implement comprising a frame, a track carried thereby, a carriage movable on said track, a cam track, a member carried by said carriage and riding on the cam track, a ground engaging member pivotally mounted on said carriage, a latch on said first named member adapted to engage said ground engaging member to remove it from the ground as said member moves on the cam track, means for releasing said latch at a predetermined point in the movement of said carriage whereby said ground engaging member may engage the ground, and means for holding said latch in inoperative position when the ground engaging member is in the ground.

7. In a planting implement having a frame, a member movable longitudinally of the frame, and a ground engaging member carried by said member about a vertical and a horizontal pivot for pivotal movement in two planes.

8. In a planting implement having a frame, a carriage movable longitudinally of the frame, a ground engaging member mounted on said carriage about both vertical and horizontal pivots, and a latch device for said member mounted on said carriage by two pivots whose axes are substantially at right angles to each other.

9. In a planting implement, a ground engaging member comprising an arm movable toward and away from the ground, a head pivotally mounted on said arm and having a portion adapted to engage the ground, releasable latch means for restraining said head from pivotal movement and means on said implement to engage said latch at one point and release it at another point.

10. In a planting implement having a frame and a carriage movable longitudinally of the frame, an arm pivotally mounted on the carriage for movement toward and away from the ground, a head pivotally mounted on the arm and having a portion adapted to engage the ground, a latch for preventing pivotal movement of the head, means operative at one point in the movement of said carriage for moving the head into engagement with the latch, and means operative at another point in the movement of the carriage to release said latch whereby the head may swing about its pivot.

11. In a planting implement having a frame and a carriage movable longitudinally of the frame, an arm pivotally mounted on the carriage for movement toward and away from the ground, a head pivotally mounted on the arm and having a portion adapted to engage the ground, a latch for preventing pivotal movement of the head, means operative at one point in the movement of said carriage for moving the head into engagement with the latch, and means operative at another point in the movement of the carriage to release said latch whereby the head may swing about its pivot, and a second latch adapted to engage said arm to move it away from the ground, the means for moving the head into engagement with the first latch also being effective to release the second latch.

12. A planting implement comprising a frame mounted on wheels and adapted to be connected to a source of motive power, a second frame independently mounted on wheels and connected to said first frame for vertical movement relatively thereto, a planter unit carried by one of said frames, means carried by said second frame and movable longitudinally thereof and having a portion adapted to engage the ground, and means operable by said last named means for operating said planter unit.

13. A planting implement comprising a frame mounted on wheels and adapted to be connected to a source of motive power, a second frame independently mounted on wheels and connected to said first frame for vertical movement relatively thereto, a plurality of planter units carried by said second frame, a plurality of carriages mounted on said second frame for longitudinal movement thereon, means on said carriages for alternately engaging the ground for causing movement of the carriages, operating means for the planter units, and means on said carriages engageable with the operating means to operate the planter units.

14. In a planting implement having a frame, a planter unit mounted on the frame, operating means for the planter unit including an elongated member having a plurality of cam portions thereon, and a member movable along said elongated member and engaging said cam portions to move said elongated member and operate the planter unit.

15. In a planting implement a horizontal track a carriage movable along said horizontal track, gorund engaging means carried by said carriage, latch means engageable with said ground engaging means to move the same out of engagement with the ground, said latch means being connected to move with said carriage and means to move said latch means vertically relatively to the carriage.

16. A planting implement comprising a pair of horizontal tracks, carriages mounted on said tracks, connections between said carriages to cause them to move in opposite directions, ground engaging members movably mounted on the carriages, a flexible cable connecting said ground engaging members, and manual means connected to said cable to decrease the effective length thereof thereby to move said ground engaging members out of engagement with the ground.

17. A planting implement comprising, a frame mounted on wheels and adapted to be connected to a source of motive power, a second frame independently mounted on wheels, means connecting said frames to prevent relative horizontal movement therebetween, a planter unit carried by said second frame, a carriage reciprocable on said second frame, and means operable by said carriage for operating said planter unit at each of a plurality of predetermined points in the movement of the carriage.

18. A planting implement comprising a frame, a pair of carriages reciprocably mounted on said frame, means connecting said carriages to cause them to move in opposite directions, ground engaging members movably mounted on the carriages, means connected to both of said ground engaging members and movable therewith, and control means mounted on said frame and engageable with said last named means to operate the same to move said members out of engagement with the ground.

FREDERICK H. HOLWICK.